(12) United States Patent
Willeke et al.

(10) Patent No.: US 8,485,212 B2
(45) Date of Patent: Jul. 16, 2013

(54) VOLUME FLOW REGULATING VALVE FOR A HYDRAULIC SYSTEM FOR CONTROLLING A BELT-DRIVEN CONICAL-PULLEY TRANSMISSION

(75) Inventors: Roshan Willeke, Karlsruhe (DE); Eric Müller, Kaiserslautern (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 967 days.

(21) Appl. No.: 12/218,234

(22) Filed: Jul. 12, 2008

(65) Prior Publication Data
US 2009/0026394 A1 Jan. 29, 2009

Related U.S. Application Data

(60) Provisional application No. 60/961,272, filed on Jul. 18, 2007, provisional application No. 60/966,097, filed on Aug. 24, 2007.

(51) Int. Cl.
*G05D 11/03* (2006.01)
(52) U.S. Cl.
USPC ............ 137/115.22; 137/115.03; 137/115.09; 137/115.13; 137/115.26
(58) Field of Classification Search
USPC ............ 137/115.03, 115.04, 115.07, 115.22, 137/115.23, 115.01, 115.09, 115.13, 115.18, 137/115.21, 115.26, 115.28
See application file for complete search history.

(56) References Cited

U.S. PATENT DOCUMENTS

| | | | | |
|---|---|---|---|---|
| 4,388,941 A * | 6/1983 | Riedhammer | .................. | 137/82 |
| 4,420,934 A * | 12/1983 | Udono | ............................. | 60/422 |
| 4,785,690 A | 11/1988 | Yokoyama et al. | ............. | 477/45 |
| 5,333,638 A * | 8/1994 | Maxwell | .................. | 137/115.04 |
| 5,782,260 A * | 7/1998 | Jacobs et al. | .............. | 137/118.02 |
| 6,170,508 B1 | 1/2001 | Faust et al. | ...................... | 137/12 |
| 6,463,954 B1 | 10/2002 | Panther | ......................... | 137/316 |
| 6,468,171 B1 | 10/2002 | Panther | .......................... | 474/28 |
| 6,565,464 B1 | 5/2003 | Panther | .......................... | 474/28 |
| 6,994,102 B2 * | 2/2006 | Yamaguchi et al. | ...... | 137/115.13 |
| 2003/0102027 A1* | 6/2003 | Tougasaki et al. | ........ | 137/115.03 |
| 2004/0211469 A1* | 10/2004 | Muller | .......................... | 137/535 |
| 2005/0227809 A1* | 10/2005 | Bitzer et al. | ..................... | 477/37 |
| 2005/0288136 A1* | 12/2005 | Lorenz | ............................... | 474/8 |

FOREIGN PATENT DOCUMENTS

| | | |
|---|---|---|
| DE | 33 15 537 A1 | 11/1984 |
| DE | 199 30 868 A1 | 1/2000 |
| DE | 100 38 212 A1 | 3/2001 |

* cited by examiner

*Primary Examiner* — John Fox
*Assistant Examiner* — Kevin Murphy
(74) *Attorney, Agent, or Firm* — Alfred J. Mangels

(57) ABSTRACT

A volume flow regulating valve for a hydraulic system for controlling a belt-driven conical-pulley transmission. The valve includes a control piston with a pressure surface and an oppositely facing pressure return surface. A supply segment is associated with the pressure surface, and a cooler return segment is connectable with the supply segment by a control edge of the control piston. A pressure return segment is associated with the pressure return surface, and a pressurizing segment is situated between the cooler return segment and the pressure return segment.

11 Claims, 1 Drawing Sheet

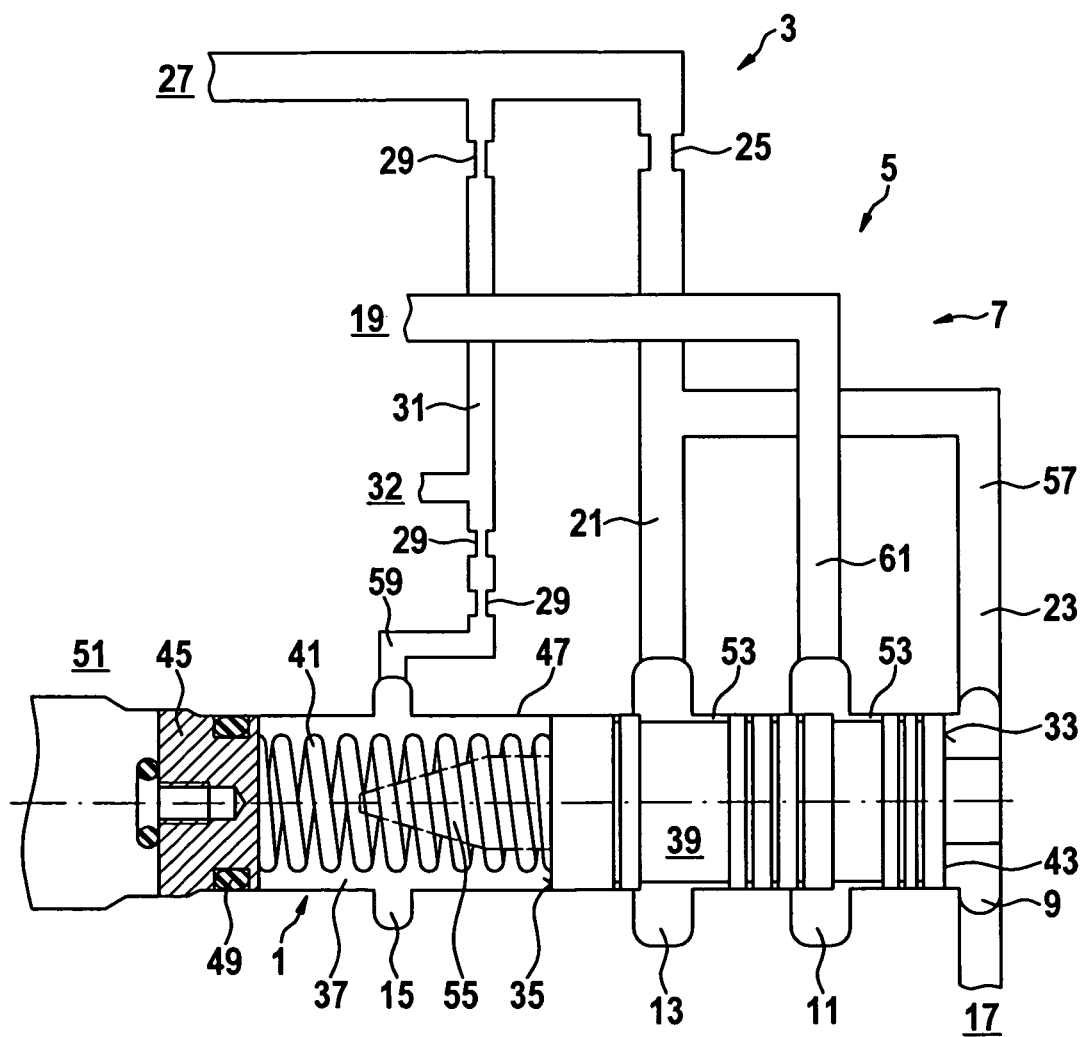

VOLUME FLOW REGULATING VALVE FOR A HYDRAULIC SYSTEM FOR CONTROLLING A BELT-DRIVEN CONICAL-PULLEY TRANSMISSION

BACKGROUND OF THE INVENTION

1. Field of the Invention

The present invention relates to a volume flow regulating valve for a hydraulic system, and to a hydraulic system for controlling a belt-driven conical-pulley transmission (CVT). The invention also relates to a belt-driven conical-pulley transmission controlled thereby and to a motor vehicle equipped therewith.

2. Description of the Related Art

Belt-driven conical-pulley transmissions can have a continuously variable transmission ratio, in particular an automatically occurring transmission ratio variation.

Such continuously variable transmissions include, for example, a start-up unit, a reversing planetary gearbox as the forward/reverse drive unit, a hydraulic pump, a variable speed drive unit, an intermediate shaft, and a differential. The variable speed drive unit includes two conical pulleys and an encircling element. Each conical pulley includes a first, axially fixed conical disk and a second, axially displaceable conical disk. An endless torque-transmitting means runs between the pairs of conical pulleys and can be, for example, a steel thrust belt, a traction chain, or a belt. By axially displacing the second conical disk relative to the first conical disk, the running radius of the endless torque-transmitting means changes, and hence so does the transmission ratio of the continuously variable automatic transmission.

Continuously variable automatic transmissions require a particular pressure level, sometimes high, in order to be able to move the conical disks of the variable speed drive unit with the desired speed at all operating points, and also to transmit the torque with sufficient basic pressing force largely without wear. The overall control can be provided by means of an electrical control system, which can include electrically operated proportional valves, for example.

An object of the present invention is to provide an improved volume flow regulating valve, in particular a lower-wear and more simply constructed volume flow regulating valve, for a hydraulic system for controlling a belt-driven conical-pulley transmission.

SUMMARY OF THE INVENTION

The object is achieved with a volume flow regulating valve in accordance with the present invention for a hydraulic system for controlling a belt-driven conical-pulley transmission. The volume flow regulating valve includes a control piston with a pressure surface, a pressure return surface situated opposite the pressure surface and acting in the opposite direction, a supply segment associated with the pressure surface, a cooler return segment associated with the supply segment by means of a control edge of the control piston, a pressure return segment associated with the pressure return surface, and a pressurizing segment situated between the cooler return segment and the pressure return segment. Advantageously, the pressurizing segment can be connected to a system pressure of the hydraulic system in such a way that a leakage flow that is possibly driven by a pressure difference between the pressure return segment and the cooler return segment can be prevented. Advantageously, in comparison to known volume flow regulating valves this requires only a pressurizing segment. It is unnecessary to use a connecting bore within the control piston, for example, for that purpose. In addition, the volume flow regulating valve can be connected so that there is a pressure difference between each of the segments present, which drives a desired leakage flow for lubricating the control piston in a corresponding cylindrical recess. On the whole, the result is a simply constructed and economically producible volume flow regulating valve, and is low in wear because of the good lubrication.

A preferred exemplary embodiment of the volume flow regulating valve provides that the pressure surface has the control edge. The pressure surface and the supply segment can be situated on one face of the volume flow regulating valve, or of the control piston of the volume flow regulating valve. By shifting the control piston or the pressure surface of the control piston in the direction of the cooler return segment, a connection can be established between the cooler return segment and the supply segment to regulate the flow volume of a hydraulic medium that is conducted via the supply segment.

Another preferred exemplary embodiment of the volume flow regulating valve provides that the volume flow regulating valve is achieved in a cylindrical bore of a hydraulic plate. Advantageously, no other component—for example a separate sleeve—is necessary to achieve the volume flow regulating valve. The cylindrical bore can accommodate the control piston, which advantageously has an essentially uniform diameter, aside from grooves that provide control edges.

Another preferred exemplary embodiment of the volume flow regulating valve provides that the control piston is coupled to a spring to apply a spring force that acts opposite to the pressure force of the pressure surface. The dimensioning of the spring or the spring force applied by the latter enables the regulating behavior of the volume flow regulating valve to be set.

The object is also achieved with a hydraulic system for a motor vehicle for controlling a belt-driven conical-pulley transmission having a variably adjustable transmission ratio, and including a volume flow regulating valve as described above. The benefits described previously result from the use of such a valve.

Another preferred exemplary embodiment of the hydraulic system provides that the supply segment is connected after a hydraulic energy source and ahead of a control orifice plate. A flow volume of a hydraulic medium produced by the hydraulic energy source can be conducted through the supply segment to the control orifice plate. As that is done, a higher pressure arises before the control orifice plate than after the control orifice plate, and in consequence a higher pressure within the volume flow regulating valve on the pressure surface than on the pressure return surface. If the resulting pressure force exceeds the spring force applied by means of the spring, as the pressure increases it can cause the control piston or the control edge to be moved in the direction of the cooler return orifice plate until the latter opens and regulating equilibrium is reached.

Another preferred exemplary embodiment of the hydraulic system provides that the pressurizing segment is connected ahead of the control orifice plate and after the hydraulic energy source. Advantageously, the system pressure produced by means of the hydraulic energy source is substantially achieved at the pressurizing segment. Under the conditions of the system, the system pressure sets the highest pressure level, so that starting from the pressurizing segment a desired flow volume for lubricating the control piston can be set in motion in the direction of the pressure return segment and the cooler return segment.

Another preferred exemplary embodiment of the hydraulic system provides that the pressurizing segment is associated with the hydraulic energy source through the supply segment. The association can be accomplished by means of a simple coupling or parallel connection of the pressurizing segment and the supply segment. To that end, a connecting line extending between the control orifice plate and the supply segment can have a branch to the pressurizing segment.

Another preferred exemplary embodiment of the hydraulic system provides that the pressure return segment is connected after the control orifice plate.

The object is also achieved with a belt-driven conical-pulley transmission having a previously described hydraulic system and/or volume flow regulating valve. The benefits described previously result from the use of such a valve.

The object is also achieved with a motor vehicle having a previously described belt-driven conical-pulley transmission. The benefits described previously result from the use of such a valve.

BRIEF DESCRIPTION OF THE DRAWING

The structure, operation, and advantages of the present invention will become further apparent upon consideration of the following description, taken in conjunction with the accompanying drawing in which:

FIG. 1 shows a longitudinal section of an embodiment of a volume flow regulating valve in accordance with the present invention and part of a hydraulic circuit diagram of a hydraulic system for controlling a belt-driven conical-pulley transmission.

DESCRIPTION OF THE PREFERRED EMBODIMENTS

FIG. 1 shows a volume flow regulating valve 1 as part of a hydraulic circuit diagram of a hydraulic system 3 for controlling a belt-driven conical-pulley transmission 5 of a motor vehicle 7. From right to left in the orientation of FIG. 1, and axially spaced from each other, volume flow regulating valve 1 includes a supply segment 9, adjacent to it a cooler return segment 11, adjacent to that a pressurizing segment 13, and adjacent to that a pressure return segment 15. Supply segment 9 is connected downstream of a hydraulic energy source indicated in FIG. 1 by the reference numeral 17. Cooler return segment 11 is associated with a cooler return conduit indicated in FIG. 1 by the reference numeral 19. Pressurizing segment 13 is connected in parallel through a parallel branch 21 of supply segment 9, and can be pressurized with system pressure produced by means of hydraulic energy source 17. Supply segment 9 is associated with or connected upstream of a control orifice plate 25 by means of a connecting line 23. Connecting line 23 branches into the parallel branch 21 and is thus part of a direct connection between supply segment 9 and pressurizing segment 13. Hydraulic components of the belt-driven conical-pulley transmission, indicated by reference numeral 27, are connected downstream from control orifice plate 25. The hydraulic components can be additional valve systems, for example for selecting gear ranges of the belt-driven conical-pulley transmission, for engaging or releasing a parking lock of the belt-driven conical-pulley transmission, for setting a transmission ratio of the belt-driven conical-pulley transmission, for setting or maintaining a clamping pressure of the belt-driven conical-pulley transmission, and/or other hydraulic components. Downstream from control orifice plate 25, a return line 31 having several spaced orifice plates 29 is connected with pressure return segment 15. To prevent excessive pressure, return line 31 can branch to a pressure relief valve indicated by reference numeral 32.

A right-hand end face of a control piston 39 of volume flow regulating valve 1 includes a first pressure surface 33. First pressure surface 33 is pressurized with the system pressure produced by means of hydraulic energy source 17 that results in a pressure force that acts toward the left, as viewed in the orientation of FIG. 1, on first pressure surface 33 of control piston 39. Spaced axially from first pressure surface 33 along control piston 36 and facing in the opposite direction, on a left-hand end face of the control piston is a second or pressure return surface 35. Pressure return surface 35 is located in a spring chamber 37 of volume flow regulating valve 1 that is pressurizable with hydraulic medium by way of return line 31 and pressure return segment 15. A return pressure, which is dependent upon on a supply pressure that exists downstream from control orifice plate 25, arises in spring chamber 37 and bears on pressure return surface 35 to provide a pressure force that acts opposite to the pressure force resulting from pressure applied to pressure surface 33.

Also acting on control piston 39 in a direction opposite to the force resulting from the hydraulic pressure acting on pressure surface 33, is a return force provided by a spring 41, which is a helical pressure spring. Spring 41 is biased against control piston 39 so that in the unpressurized state control piston 39 is pressed completely to the right, as viewed in the orientation of FIG. 1. Against that return force provided by spring 41 and the pressure return surface force, control piston 39 can be moved to the left by means of a pressure that is built up ahead of control orifice plate 25, until the position of control edge 43 permits a connection of supply segment 9 with cooler return segment 11. As that occurs, a regulating equilibrium develops, under which the flow volume flowing away through control orifice plate 25 to the hydraulic components 27 can be regulated. Any excess flow volume that can possibly be delivered by hydraulic energy source 17 is fed into cooler return conduit 19.

To seal off spring chamber 37, volume flow regulating valve 1 carries a plug 45, which is sealed against a cylindrical bore 47 by means of a sealing ring 49, for example an O-ring. Cylindrical bore 47 can be made in a hydraulic plate 51 of hydraulic system 3, for example a die-cast plate. Advantageously, control piston 39 has a substantially uniform diameter, aside from grooves 53, for labyrinth seals and/or control surfaces. Spring 41 is associated with control piston 39 by means of a supporting tongue 55 of control piston 39. To transmit appropriate spring forces, spring 41 bears against plug 45 and against pressure return surface 35.

The parallel connection of supply segment 9 and pressurizing segment 13 results in a first pressure level within conduit 57 that corresponds with the system pressure of the hydraulic energy source 17. A second pressure level in conduit 59 that is smaller than the first pressure level in conduit 57 arises in the pressure return segment 15. A third pressure level within conduit 61 that is lower than the second pressure level in conduit 59 arises in the cooler return segment 11. It is apparent that without the pressurizing segment 13, or without the application to the pressurizing segment 13 of the first pressure level in conduit 57, a leakage flow from the spring chamber 37 in the direction of the cooler return segment 11 results. In the event of wear of the control piston 39 that leakage flow will lead to an undesired shift of the regulation point of the volume flow regulating valve in the direction of lower pressures. Advantageously, such an undesired leakage flow can be prevented by means of the first pressure level in conduit 57 acting on pressurizing segment 13. An undesired shift of the regulation point to lower pressures can thereby be avoided.

Advantageously, the right-hand end face of control piston 39 serves on the one hand to provide the first control edge 43, in order to limit the flow volume supplied from the hydraulic energy source 17 to the cooler return 19, and on the other hand as pressure return or pressure surface 33 of control piston 39.

The pressurizing segment 13 prevents leakage from spring chamber 37, and thus prevents a pressure drop in spring chamber 37, while it is possible to prevent premature regulation when wear possibly occurs on control piston 39.

Advantageously, volume flow regulating valve 1 can be provided in hydraulic plate 51. Along with the segments 11, 13, 15, and 17, volume flow regulating valve 1 has a pressure return downstream of control orifice plate 25 through return line 31 into pressure chamber 37. Control piston 39 is provided as a continuous piston without a change in diameter.

Because of the pressure drop across control orifice plate 25, which is dependent upon a corresponding flow rate prevailing there, a force differential arises on control piston 39, produced by the two different pressures acting on first pressure surface 33 and on pressure return surface 35. As the flow volume increases, the resulting pressure force on control piston 39 increases proportionally until the differential force exceeds the spring force of spring 41. Control piston 39 then moves until the control edge 33 shifts to permit flow to the cooler return conduit 19, and thus the supply flow volume from hydraulic energy source 17 to control orifice plate 25 is regulated. Equilibrium is reached Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A volume flow regulating valve for a hydraulic system for controlling a belt-driven conical-pulley transmission, said valve comprising:
    a solid control piston slidably carried within a cylindrical bore, the control piston having a first pressure surface including a first control edge, and a second, pressure return surface axially spaced from and facing in a direction opposite to the first pressure surface, and including a pair of axially spaced annular grooves inwardly of the first pressure surface and the second, pressure return surface and defining respective fluid-receiving chambers for interconnecting valve segments;
    a supply segment in fluid communication with the first pressure surface;
    a cooler return segment in fluid communication with the supply segment upon movement of the first control edge of the control piston away from the supply segment and to the cooler return segment;
    a pressure return segment in fluid communication with the second, pressure return surface; and
    a pressurizing segment situated between the cooler return segment and the pressure return segment and in fluid communication with the supply segment through a conduit that is external of the cylindrical bore, wherein pressure within the pressurizing segment operates to prevent leakage flow from the pressure return segment to the pressurizing segment between the cylindrical bore and the control piston as increased wear occurs between the control piston and the cylindrical bore, thereby preventing a drop in pressure acting against the second, pressure return surface of the control piston.

2. A volume flow regulating valve in accordance with claim 1, wherein the volume flow regulating valve is situated in a cylindrical bore of a hydraulic plate.

3. A volume flow regulating valve in accordance with claim 1, wherein the control piston is coupled with a spring for applying a spring force that acts in a direction opposite to a direction of a pressure force that acts on the first pressure surface.

4. A hydraulic system for controlling a belt-driven conical-pulley transmission of a motor vehicle and having a variably adjustable transmission ratio, wherein the hydraulic system includes a volume flow regulating valve in accordance with claim 1.

5. A hydraulic system in accordance with claim 4, wherein the supply segment is connected downstream of a hydraulic energy source and upstream of a control orifice plate.

6. A hydraulic system in accordance with claim 5, wherein the pressurizing segment is in fluid communication with the control orifice plate and the hydraulic energy source.

7. A hydraulic system in accordance with claim 6, wherein the pressurizing segment is in fluid communication with the hydraulic energy source through the supply segment.

8. A hydraulic system in accordance with claim 5, wherein the pressure return segment is connected downstream from the control orifice plate.

9. A belt-driven conical-pulley transmission having a hydraulic system in accordance with claim 4.

10. A motor vehicle having a belt-driven conical-pulley transmission in accordance with claim 9.

11. A belt-driven conical-pulley transmission having a volume flow regulating valve in accordance with claim 1.

* * * * *